(12) United States Patent
Engbersen et al.

(10) Patent No.: US 7,957,387 B2
(45) Date of Patent: *Jun. 7, 2011

(54) PACKET CLASSIFICATION

(75) Inventors: Antonius Engbersen, Feusisberg (CH);
Jan Van Lunteren, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 52 days.

This patent is subject to a terminal disclaimer.

(21) Appl. No.: 12/480,280

(22) Filed: Jun. 8, 2009

(65) Prior Publication Data

US 2009/0310504 A1 Dec. 17, 2009

Related U.S. Application Data

(63) Continuation of application No. 10/853,663, filed on May 21, 2004, now Pat. No. 7,545,809.

(30) Foreign Application Priority Data

May 28, 2003 (EP) ..................................... 03405389

(51) Int. Cl.
*H04L 12/56* (2006.01)
*G06F 17/30* (2006.01)
(52) U.S. Cl. ......................... 370/392; 370/395.32; 707/3
(58) Field of Classification Search ........................ None
See application file for complete search history.

(56) References Cited

U.S. PATENT DOCUMENTS

2002/0191605 A1 12/2002 Lunteren

FOREIGN PATENT DOCUMENTS

EP 1128608 8/2001

OTHER PUBLICATIONS

Research Report-Prefix based Parallel Packet Classification, by A.P. J. Engemersen and J. Van Lunteren, 15 pages, Mar. 6, 2000.
High-Speed Policy-based Packet forwarding Using Efficient Multi-dimensional Range Matching T.V. Lakshman and D. Stiliadis, Bell Laboratories, 13 pages, 1998.
Dynamic Multi-Field Packet Classification, by Jay van Lunteren and Tom Engbersen, IBM Research, Zurich Research Laboratory, pp. 2215-2219, 2002.
Packet Classification on Multiple Fields, by Pankaj Gupta and Nick McKeown, Computer System Laboratory, Stanford University, 14 pages, Aug. 1999.

*Primary Examiner* — Gregory B Sefcheck
(74) *Attorney, Agent, or Firm* — Michael J. Buchenhorner; Derek S. Jennings (57) ABSTRACT

An apparatus for classifying a data packet includes an interface for receiving the data packet; a classification controller for parsing the data packet to identify a plurality of data items required for classifying the data packet; memory for storing a set of range identifiers for each data item in the data packet corresponding to a rule range defined in the rule sets; and a controller for performing a preliminary test of at least one of the data items to determine whether any of the data item's values match known frequently-occurring values for that data item.

12 Claims, 6 Drawing Sheets

| Interval | Range ID | Interval | Range ID |
|---|---|---|---|
| X0 | 00000 | Y0 | 00000 |
| X1 | 11000 | Y1 | 01000 |
| X2 | 01100 | Y2 | 01010 |
| X3 | 01000 | Y3 | 01011 |
| X4 | 01010 | Y4 | 01100 |
| X5 | 01011 | Y5 | 10010 |
| X6 | 10010 | Y6 | 10000 |
| X7 | 10000 | Y7 | 00000 |
| X8 | 00000 | | |

PACKET CLASSIFICATION

CROSS-REFERENCE TO RELATED APPLICATIONS

This application is a continuation of commonly-owned, co-pending U.S. patent application Ser. No. 10/853,663, filed on May 21, 2004, issued as U.S. Pat. No. 7,545,809, which is incorporated by reference herein in its entirety.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

This invention relates generally to classification of data packets in data processing devices.

BACKGROUND OF THE INVENTION

Packet classification is performed by devices in data processing systems, in particular data communications networks, to determine how data packets should be handled by the processing device. For example, to implement network services such as routing, differentiated QoS (Quality-of-Service), firewall access control, traffic shaping etc., various packet "flows" are defined. A flow is essentially a set of data packets to which a specified handling policy, or "rule", applies. Such rules may specify, for example, whether a packet should be forwarded or filtered, where it should be forwarded to, the priority or class of service to be applied to the packet, and the amount to be charged for the transmission. The particular flow to which a packet belongs, and hence the processing rule to be applied to the packet, is determined from the values of various data items in the packet, typically some combination of values in the packet header fields such as the source IP (Internet Protocol) address, destination IP address, source and destination port numbers, protocol, etc. By way of example, a rule might specify that all packets from particular source addresses to particular destination addresses should be forwarded with highest priority, or, in a firewall for example, should be denied access. For each data item in the packet format which must be evaluated to determine applicability of a given rule, the rule specifies a corresponding range of data values, referred to herein as a "rule range", for which the rule applies. In general, a rule range may consist of a single value or a series of (not necessarily contiguous) values for the data item in question, and may be defined in various ways e.g. by the first and last values in a series, or by a prefix, or by an exact value for single-value ranges. In any case, for each rule, a rule range is defined for each of the data items to be evaluated, and a packet is identified as belonging to the flow for which the rule applies if each of the relevant data item values in the packet intersects (i.e. lies within) the corresponding rule range. Where a set of rules is such that a given packet may satisfy the conditions of more than one rule in the set, then the rules can be prioritized on some basis and the highest priority rule satisfied by the data packet selected as the applicable rule for that packet.

The basic process described above is generally referred to as "multi-field" packet classification since evaluation of multiple data items (typically packet header fields) is required as part of the classification process. Combinations of data item values in a packet are effectively mapped to applicable rules via a search process, which may involve a number of stages, with the input data item values providing the initial search keys for the search process. Current multi-field classification schemes can be divided into three categories:

(1) schemes that convert the multi-field search problem into a single-field problem by concatenating the individual data items together to form one large, composite search key which is then searched using a single-field search algorithm;

(2) schemes that search the multiple data items sequentially in a dependent manner, i.e. the results for data items that have already been searched influence the way subsequent data items are searched; and (3) schemes that search each data item independently and then determine the classification result based on the results of the item searches, e.g. by an additional, final search.

One example of a category scheme is disclosed in our copending European patent application published under EP-A-1128608, and a related scheme is discussed in IBM Research Report RZ 3210, "Prefix-based Parallel Packet Classification, Engbersen et al., published on 3 Jun. 2000. Another example is disclosed in our copending U.S. patent application Ser. No. 10/090,592. Further category systems are disclosed in: Proc. ACM SIGCOMM'98, Comp. Commun. Rev. Vol. 28, No. 4, October 1998, pp. 203-214, "High-Speed Policy-based Packet Forwarding using Efficient Multi-dimensional Range Matching", Lakshman et al; and ACM SIGCOMM'99, Comp. Commun. Rev. Vol. 29, No. 4, October 1999, pp. 147-160, "Packet Classification on Multiple Fields", Gupta et al. The latter two systems are summarized in "Dynamic Multi-Field Packet Classification", van Lunteren et al., Proceedings of the IEEE Global Telecommunications Conference GLOBECOM'02, Taipei Taiwan, November 2002, together with a scheme based on that described in our US patent application referenced above.

All of the referenced category schemes perform independent item searches for each data item to be evaluated in the data packet, i.e. the result of each item search is not dependent on the result of any other. In each case, the item search for a particular data item involves the selection, via some form of search data structure, of an identifier corresponding to the value of that data item from a predetermined set of identifiers. This set of identifiers, referred to herein as "range identifiers", effectively indicate, for all possible values of the data item, which of the rule ranges corresponding to that data item a value intersects. The particular way in which a range identifier indicates the intersected rule ranges varies from scheme to scheme. For example, in the Lakshman reference above, all rule information (i.e. rule ranges and rule priorities) is encoded in the range identifiers, so that the highest priority applicable rule can be determined directly from the set of range identifiers for a given packet, here by a logical AND operation, without performing a final search. In contrast, in the Gupta reference above, no rule information whatsoever is encoded in the range identifiers. The identifiers here are simply arbitrary values which distinguish the different combinations of intersected rule ranges for possible data item values. These identifiers are linked to applicable rules via the final search structure which contains rule data encoding all the rule information. The range indicators in this scheme thus indicate the intersected rule ranges indirectly via the final search structure. In the other schemes referenced above, the range identifiers are generated by various processes based on the concept of "primitive range hierarchies". Here some, but not all, of the rule information is encoded in the range identifiers, the remaining rule information being encoded in the rule data contained in the final search structure. In any case, where a final search is employed in these schemes, the rule data used in the final search effectively encodes the rule ranges for each rule in the rule set, in that range identifiers indicating rule ranges intersected by item values are linked via the final search structure to applicable rules.

Multi-field packet classification is typically performed by each data processing device (such as servers, switches, routers, bridges, brouters, etc.) in the path across a network system, be it a network or internetwork, via which the packet is forwarded between its source and destination nodes. Due to the increasing volume of traffic handled by modern network systems, and continuing improvements in network technologies, the fundamental task of packet classification is increasingly critical to overall network efficiency. Advanced packet classifiers that are capable of examining packets at full wire-speed against large and dynamic sets of complex classification rules are essential building blocks for realizing important emerging Internet applications such as QoS, firewalls, and web-server load balancing. While the problem of searching based on single packet fields (e.g. routing table look-ups) is considered to be well solved, multi-field classification remains a challenging problem. This is due to the multi-field nature of the search process as described above, in combination with the large number of bits, often of the order of hundreds, that have to be inspected for each packet. Meeting the wire-speed challenge in a cost-efficient manner requires classifiers that are also highly storage-efficient. This is necessary because SDRAM performance cannot keep pace with rapidly-increasing link speeds, forcing classifiers to use faster memory technologies, such as SRAM, embedded DRAM and ternary CAM (TCAM), which are substantially more expensive and have significantly smaller storage capacity. Adding to the challenge, the dynamic nature of several new applications also necessitates improved update rates to accommodate rule changes, this typically being a conflicting goal.

It will be appreciated from the foregoing discussion of basic multi-field classification processes that improving efficiency of these processes is a highly desirable objective. However, while the discussion has focused on packet classification for a single rule set, it is often necessary to classify data packets according to a plurality of different rule sets, thus compounding the basic problems discussed above. For example, different rule sets may be provided for different processing applications, such as ACL (Access Control List) in firewalls, QoS, etc., of a network device, so that a given packet must be classified according to each of the rule sets to determine the applicable rule in each case. At present, separate multi-field classification processes are performed for each rule set in turn. This introduces additional performance delays as well as exacerbating the fundamental difficulties already discussed.

SUMMARY OF THE INVENTION

Briefly, according to an embodiment of the invention an apparatus for classifying a data packet according to a plurality of differing sets of processing rules includes: an interface for receiving the data packets; a classification controller for parsing the data packet to identify a plurality of data items required for classifying said data packet; memory for storing a set of range identifiers for each data item in the data packet corresponding to a rule range defined in the rule sets, the set of range identifiers for said data item indicating, for all possible values of the data item, which of the rule ranges corresponding to that data item in the rule sets a value intersects; and a controller for performing a preliminary test of at least one of the data items to determine whether any of said data item's values match known frequently-occurring values for that data item.

A method according to an embodiment of the present invention can also be implemented as machine executable instructions executed by a programmable information processing system or as hard coded logic in a specialized computing apparatus such as an application-specific integrated circuit (ASIC).

BRIEF DESCRIPTION OF THE DRAWINGS

To describe the foregoing and other exemplary purposes, aspects, and advantages, we use the following detailed description of an exemplary embodiment of the invention with reference to the drawings, in which.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Figure 1:
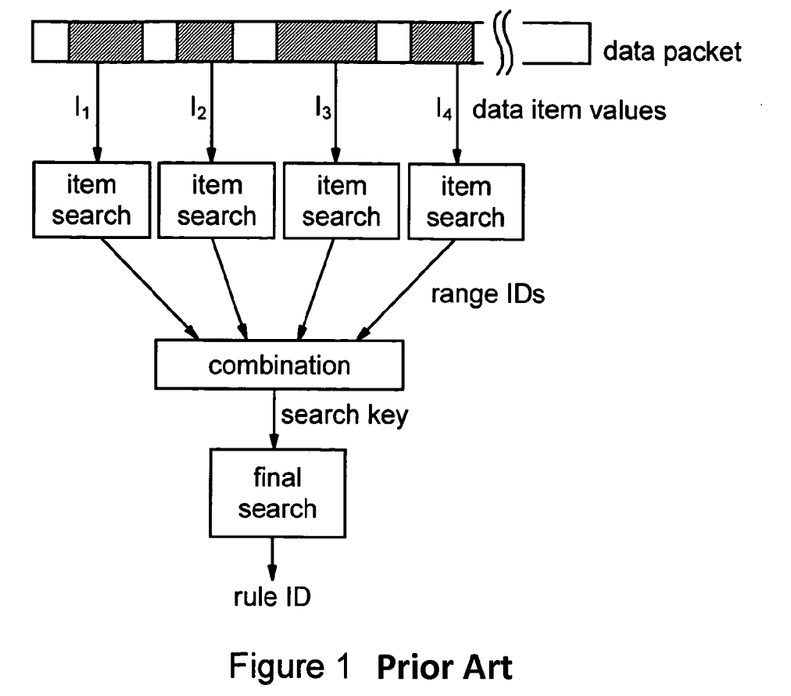
FIG. 1 illustrates a basic multi-field classification process of the category (3) type discussed above.

Before describing the preferred embodiments in detail, it is useful first to consider the operation of a basic multi-field packet classification process on which the embodiments to be described are based. FIG. 1 is a schematic representation of one example of a multi-field classification process of the category type discussed above. This example assumes packets are to be classified according to a rule set which requires evaluation of only four data items in the packet, represented by the shaded segments in the figure. Typically these data items will be respective fields of the packet header, though in general a given item may consist of any part of the packet and may contain data from one or more fields. First, the packet is parsed to identify the data item values in question, and the resulting values, here $I_1$ to $I_4$, are supplied as inputs to respective item searches. For each data item, the item search effectively selects a range identifier corresponding to the input item value from a predetermined set of range identifiers as explained further below. The resulting range IDs, one for each data item, are then combined to generate a search key, and this search key is supplied as input to a final search for the rule set. This final search, discussed in more detail below, uses the input search key together with rule data encoding the rule ranges for each rule to identify an applicable rule for the packet. In the following examples it is assumed that rules in a given rule set have a defined priority order, whereby the final search identifies the highest priority rule applicable to a data packet. The output of the final search is thus a rule ID identifying the highest priority applicable rule.

The various classification methods described hereinafter are all based on the basic multi-field classification process of FIG. 1. In addition, these preferred embodiments all employ item searches using range IDs which are derived from primitive range hierarchies so as to partially encode the relevant rule ranges. The remaining part of the rule information is then encoded in the rule data utilized in the final search. One example of this type of system is disclosed in our U.S. application Ser. No. 10/090,592 referenced above, and is summarized in the following with reference to FIGS. 2 and 3.

Figure 2:
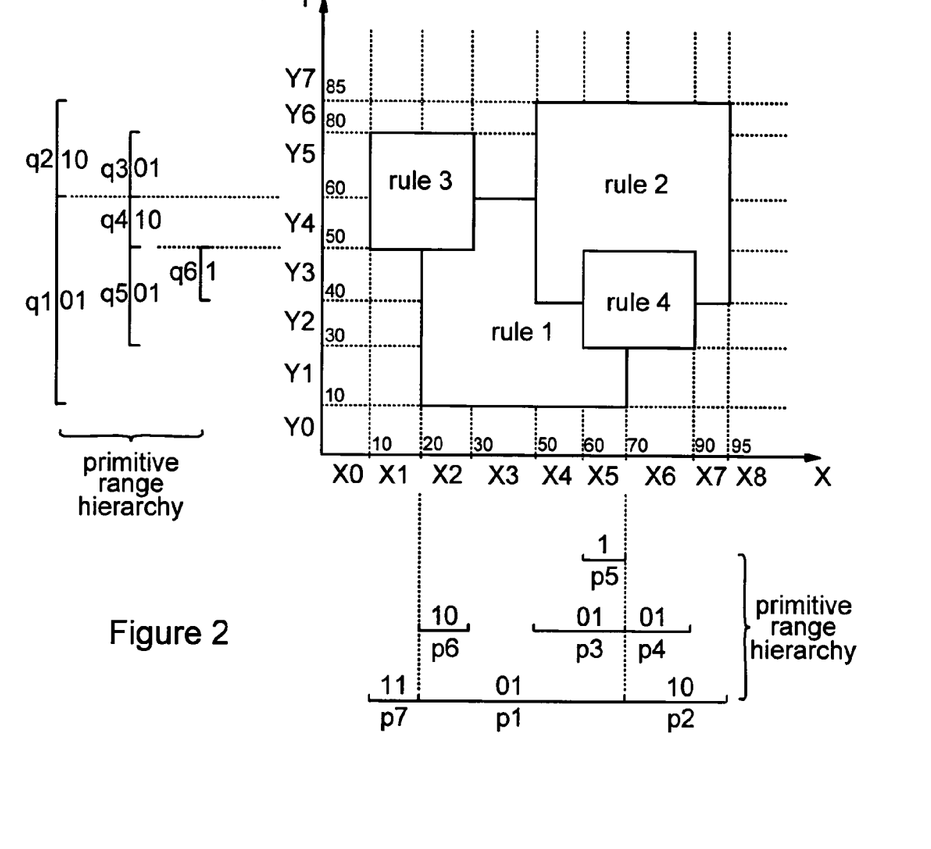
FIG. 2 shows a rule range diagram demonstrating an exemplary implementation of item searches employed in classification methods embodying the invention.
Figure 3:
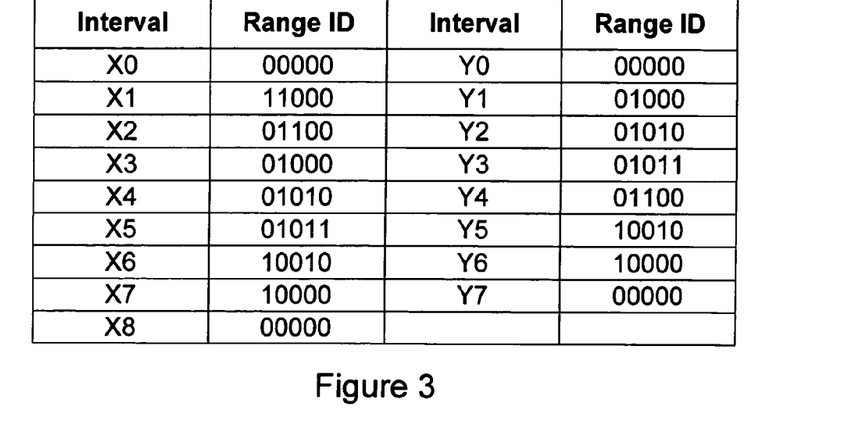
FIG. 3 is a table of range identifiers for the example of FIG. 2.

The rule range diagram of FIG. 2 demonstrates how the sets of basic range identifiers employed in the item searches can be derived from the classification rules. For simplicity, the explanation will be based on a rule set requiring evaluation of only two data items in the packet format, but the extrapolation to multiple data items will be readily apparent from this description. In the simplistic example shown, it is assumed that there are only four rules in the rule set, each rule specifying a range of possible values of items $I_1$, and $I_2$ for which, in combination, the rule applies. Each rule can thus be represented by a rectangle in two-dimensional value space as indicated by the X and Y axes in the figure, where the X-dimension corresponds to values of $I_{.sub.1}$ and the Y-dimension to values of $I_2$. The four rules are characterized as follows:

1 Rule Priority X Rule Range Y Rule Range 1 1 20-69 10-59 2 2 50-94 40-84 3 2 10-29 50-79 4 3 60-89 30-49.

Here, the priority number in column 2 signifies the relative priority rating of the rules, a higher priority being signified by a higher priority number. In FIG. 2, where two rules overlap, the rectangle representing the higher priority rule is shown on top. The intervals labeled X0 to X8 and Y0 to Y7 in the figure are obtained by projecting the rule range boundaries onto the X and Y axes respectively. For a given interval in one dimension, no change of applicable rule occurs in that interval for a fixed value in the other dimension. Thus, the set of intervals in a given dimension effectively distinguishes the different combinations of rule ranges which can be intersected by item values for that dimension. In each dimension, each interval is assigned a range ID which is derived from a primitive range hierarchy. The primitive range hierarchy for each dimension is shown adjacent the corresponding axis in the figure, and in this particular example is constructed as follows.

Each hierarchy consists of a number of primitive ranges, here labeled p1 to p7 for the X-dimension hierarchy and q1 to q6 for the Y-dimension hierarchy, where the primitive ranges correspond to respective portions of the rule ranges between rule range boundaries. In this example, for each dimension, the hierarchy is constructed such that: 1) primitive ranges in the lowest hierarchy level are non-overlapping; and 2) each primitive range in a level above the lowest hierarchy level is a subset (i.e. coextensive with or contained within) a primitive range in the level below. The order in which primitive ranges are selected and the hierarchy constructed is not critical here, though in this example primitive ranges are selected generally according to decreasing rule range size in the dimension. Thus, the hierarchy for the X-dimension in FIG. 2 is constructed by first selecting the rule range for rule 1 as primitive range p1 in the lowest hierarchy level. Next, primitive range p2 is selected as the portion of rule 2's range between the upper boundaries of rules 1 and 2, and assigned to the lowest hierarchy level. The remaining portion of rule 2's range is contained within primitive range p1. This range is therefore a subset of primitive range p1 and so is assigned to the second hierarchy level as primitive range p3. The portion of rule 4's range between the upper boundaries of rules 1 and 4 is a subset of primitive range p2 and so is assigned to the second hierarchy level as primitive range p4. The remaining portion of rule 4's range is a subset of primitive range p3 and is assigned to the third hierarchy level as primitive range p5. The portion of rule 3's range above the lower boundary of rule 1 is a subset of primitive range p1 and so forms primitive range p6 in the second hierarchy level. The remaining portion of rule 3's range forms primitive range p7 in the lowest hierarchy level. A similar process for the Y-dimension rule ranges yields the hierarchy of primitive ranges q1 to q6 in this dimension as shown in the figure.

The next step in generating the range IDs involves assigning non-zero primitive range identifiers to the primitive ranges in each hierarchy. Various systems can be employed here, but in this example the following rules are applied: (1) primitive ranges in the lowest hierarchy level have different primitive range identifiers; (2) in each higher level, primitive ranges which are subsets of the same range in the level below have different primitive range identifiers; and (3) primitive range identifiers within the same level of the hierarchy have the same number of bits. On this basis, the particular primitive range identifiers assigned in this example are noted in the figure, above the corresponding primitive range in the X-dimension hierarchy, and to the right of the corresponding primitive range in the Y-dimension hierarchy. Thus for example, in the X-dimension range p1 has primitive range identifier 01 and range p5 has identifier 1, and in the Y-dimension range q3 has primitive range identifier 01 and range q4 has identifier 10, etc.

The range IDs assigned to intervals X0 to X8 and Y0 to Y7 are then produced as follows. In each dimension, for each interval intersecting any of the rule ranges (i.e. excluding ranges X0, X8, Y0 and Y7 here), a unique range ID is produced by concatenating, in order of increasing hierarchy level, the primitive range identifiers for the primitive ranges intersected by that interval. The resulting concatenations are made up to bit-strings of equal length by adding zeros where necessary. Thus, considering the X-dimension in FIG. 2, interval X1 intersects only primitive range p7. The range ID for interval X1 therefore begins with the primitive range identifier (11) for p7, and is made up to a 5-bit string by adding zeros (since the longest concatenation of primitive range identifiers, namely that for X5, is 5 bits long). This gives a range ID for X1 of 11000. Interval X2 intersects primitive ranges p1 and p6. Concatenating the primitive range identifiers for p1 and p6 in increasing hierarchy-level order yields 0110, and one zero is then added to give a range ID for X2 of 01100. A similar process for intervals X3 to X7 yields the range IDs shown in FIG. 3 for these ranges. Ranges X0 and X8, which intersect no rule ranges, are simply assigned all-zero range IDs here. The complete set of range IDs for the X-dimension is given on the left-hand side of FIG. 3. A similar process for the Y-dimension yields a set of range IDs for this dimension as shown on the right-hand side of FIG. 3.

The above process can be extended to provide respective sets of range IDs for multiple dimensions corresponding to multiple data items to be evaluated for the rule set. Thus, referring back to FIG. 1, for each item search, a search data structure is provided comprising the set of range IDs for the corresponding data item. Each item search selects, via the corresponding search structure, the range ID corresponding to the input item value from the set of range IDs for that item. Thus, for an item value I1 in interval X1 in the FIG. 2 example, a range ID of 11000 would be selected by the item search, and so on for each data item. In practice, a given item search may comprise one or more stages, and can be implemented in generally known manner using various types of search structure such as look-up tables, search trees, etc., as will be apparent to those skilled in the art. However implemented, the resulting range identifiers for the input item values $I_1$ to $I_4$ can be used to identify, via the final search, the highest priority rule applicable to the data packet. This final search uses a search structure comprising rule data which effectively encodes the rule ranges for individual rules in terms of combinations of input range IDs for which the rule applies. The principle here can be understood by considering the simple example of FIGS. 2 and 3. For the purposes of this example, it is assumed that the search key for the final search is produced by simple concatenation of the X- and Y-dimension range IDs selected for the item values I.sub.1, and I.sub.2 in a given packet. From FIG. 2 it can be seen that rule 1 applies for I.sub.1 values in primitive range p1 in combination with $I_2$ values in primitive range q1 (ignoring rule priorities for the moment). Thus, rule 1 applies for search keys of the form 01XXX01XXX, where the first five bits represent the range ID for $I_1$, the last five bits represent the range ID for $I_2$, and X represents "don't care", i.e. either 0 or 1. Similarly, rule 4 applies for $I_1$ values in primitive range p4 or p5 in combination with $I_2$ values in primitive range q5. Thus, rule 4 applies for search keys of the form 100X0101X, and 010110101X. Similar analysis for the other rules yields the search keys for which these rules apply. These search keys can thus be related to the appropriate rule IDs via the final search structure. This search structure can take various forms, such as a look-up table, search tree etc., as before, and is constructed so as to output the highest priority rule of any rules which apply to a given packet. For example, the search key entries can be listed in order of rule priority in a look-up table, so that rule ID associated with the first matching entry in the table gives the highest priority applicable rule.

Having described a basic multi-field classification process above, embodiments of the invention which employ this basic process will now be described with reference to FIGS. 4 to 10.

Figure 4:
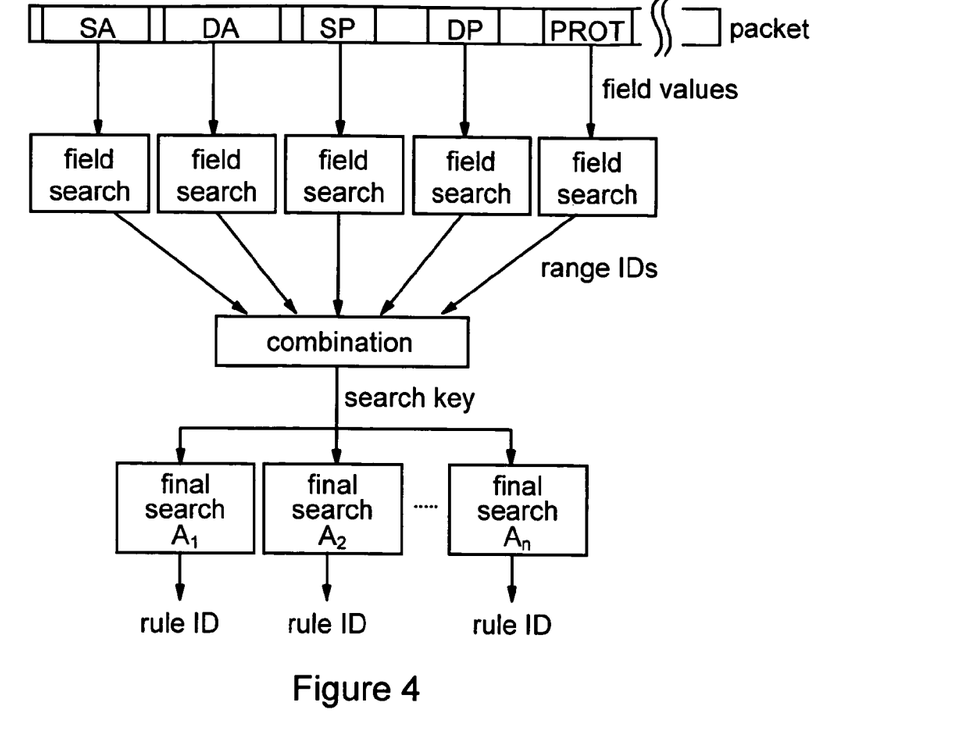
FIG. 4 illustrates a multi-field classification process embodying the first aspect of the invention.

FIG. 4 gives a schematic overview of a classification method embodying the first aspect of the invention. This method provides for classification of data packets in a network device according to each of a plurality of sets of processing rules. For example, a given device may run a series of processing applications, such as ACL, QoS, load balancing, virtual private networks (VPNs), etc., each having an associated rule set, such that the highest priority applicable rule for each rule set must be determined by the classification process. In this simple example, it is assumed that the device runs a series of applications $A_1$ to $A_n$ having associated rule sets which require evaluation of five packet header fields: the IP source address SA; IP destination address DA; the TCP (Transport Control Protocol) and UDP (User Datagram Protocol) source and destination ports SP and DP; and the protocol field PROT. Thus, each rule of each rule set defines an applicable range for each of the five data items. As illustrated in the figure, independent item searches are conducted for each field generally in accordance with the basic scheme described above. Thus, each field search selects a range ID corresponding to the input field value from a set of range IDs for the corresponding field. Here, however, the set of range IDs for a field indicate, for all possible input field values, which of the rule ranges for that field in all of the application rule sets a value intersects. Thus, the rules from all rule sets are included in the process of generating range IDs explained above with reference to the rule range diagram of FIG. 2. The resulting range IDs selected for the five input field values are combined to produce a search key as before, but in this case the search key is supplied as input to a plurality of final searches, one for each of the applications $A_1$ to $A_n$. For each final search, the search structure comprises rule data encoding the rule ranges as discussed above for the particular rule set associated with the application in question. Thus, each final search structure relates possible search keys to applicable rules in the appropriate application rule set, the output of the final search being the highest priority applicable rule in that rule set.

Figure 5:
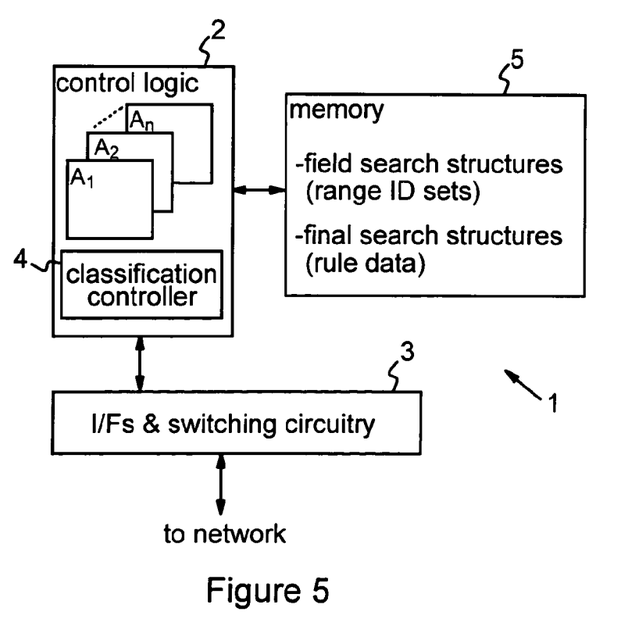
FIG. 5 is a schematic block diagram of a data processing device for implementing the embodiment of FIG. 4.

The operation of a data processing device implementing the classification process of FIG. 4 will now be described with reference to FIGS. 5 and 6. FIG. 5 is a schematic block diagram of one embodiment of a data processing device for connection as a node in a network system, illustrating the main elements involved in the classification process. The device 1 includes control logic 2 which is connected to communications circuitry 3 comprising the interfaces and switching circuitry via which the device communicates with the rest of the network. The control logic 2 controls operation of the device generally, implementing the various network functions performed by the device including processing applications A1 to An. In addition, the control logic 2 includes a classification controller 4 which implements the packet classification process. Control logic 2 is connected to memory 5 for storing the data required for the classification process, in particular the field search structures for the five fields to be evaluated for the application rule sets, and the final search structures for the rule sets. While memory 5 is represented by a single block in the figure, in general memory 5 may be implemented by one or more memories and may include memories of different types. Also, classification controller 4 may be implemented in hardware or software, or a combination thereof, but will typically be implemented by a processor running software which configures the processor to perform the functions described, and suitable software will be apparent to those skilled in the art from the description herein. (Of course, while the processor may be preconfigured with appropriate software, the program code constituting such software could be supplied separately for loading in the device to configure the processor to operate as described. Such program code could be supplied as an independent program or a program forming part of the program code for a number of control functions of control logic 2, and may be supplied embodied in a computer-readable medium, such as a diskette or an electronic transmission sent to a network operator for example, for loading in the device).

Figure 6:
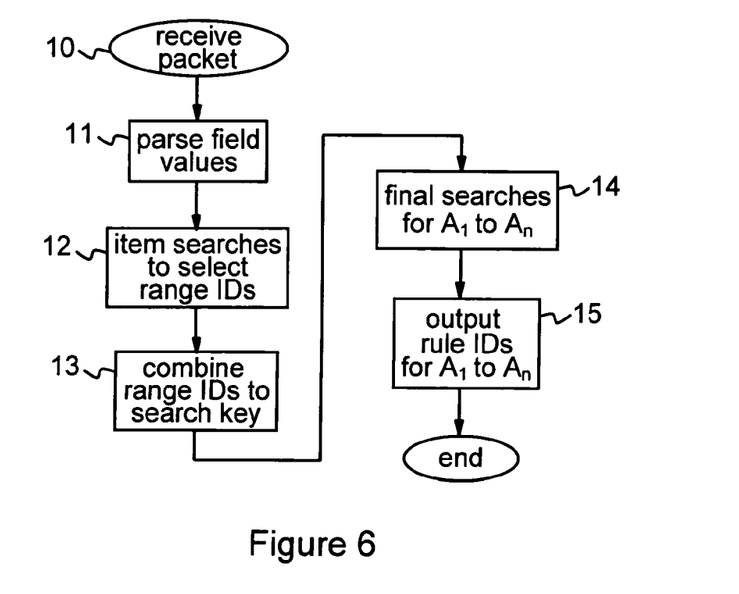
FIG. 6 is a flow chart illustrating operation of the FIG. 5 device in performing the classification process of FIG. 4.

The flow chart of FIG. 6 illustrates the basic steps of the classification process performed by device 1. On receipt of a packet at step 10 via circuitry 3 of the device, the packet is parsed at step 11 by classification controller 4 to identify the five field values required for the classification process in this example. In step 12 controller 4 then performs the field search for each field value, accessing the corresponding field search structures in memory 5 to select the appropriate range IDs for the input field values. The five range IDs are then combined in step 13 (in this example by simple concatenation as described above) to produce a search key. In step 14 controller 4 uses the resulting search key to perform the final search for each application rule set, accessing the corresponding final search structures in memory 5 to obtain the applicable rule ID for each rule set. The rule IDs are then output in step 15, and can be supplied with the packet to the respective applications $A_1$ to $A_n$ for processing in accordance with the applicable rule in each case. The classification process is then complete for the data packet.

It will be seen that, while the above method provides for classification according to multiple rule sets to find an applicable rule for each rule set, the field searches are performed only once for all rule sets. This allows rapid classification for multiple rule sets, as well as reduced storage requirements for the field searches. Each field search accommodates the relevant rule ranges from all rule sets, and since different rule sets typically contain similar rule ranges for given fields, this redundancy can be exploited in the field search structures and storage requirements further reduced. Overall, therefore, the method provides a highly efficient classification process for multiple rule sets.

Various modifications to the above example can be envisaged. For example, while all rule sets require evaluation of all fields in the above example, (i.e. the common set of data items contains all items to be evaluated for the rule sets), in other cases the common set may contain one or only a subset of all items evaluated, with particular rule sets requiring evaluation of items not required by other rule sets. In addition, the system may form part of a larger multiple rule-set classification system with additional rule sets requiring evaluation of a different set of data items. Also, while exemplary layer-4 fields are evaluated in the classification process here, in general any packet data, not necessarily restricted to layer-4 fields, may be used in the classification process. Further, while all range IDs, concatenated to a single search key, are supplied as input to all final searches in the above example, where some rule sets require evaluation of different items, only the range IDs required by a given final search may be supplied as input to that search. Also, while separate search structures are provided for each final search in this example, an alternative would be to add rule set identifier, e.g. the application ID, to the search key to produce separate search keys for each application rule set. A combined final search structure could then be used in which the rule data for each rule set is associated in the search structure with the application ID for that rule set. This search structure can then be searched multiple times, once for each rule set. A separate, logical search is still performed for each rule set, but here using a combined search structure. For example, an application ID could be added to the start of the range ID combinations stored in the final search structure for each rule set as discussed above. If the search key for each final search also starts with the associated application ID, then the search key can only match the rule data for the appropriate rule set in the combined search structure.

An advantage of the way in which range ID sets are generated in the example above is that, for a given rule set, part of the rule information is encoded in the set of range IDs via the construction of primitive range hierarchies and the assignment of primitive range identifiers in these hierarchies. Only the remaining part of the rule information then need be encoded in the final search structure. In particular, the set of range IDs for a data item partially encodes rule ranges corresponding to that data item. The rule data in the final search structure then encodes the rule ranges for the rules in a given rule set in terms of the range IDs. This system leads to particularly efficient data structures as well as improved update efficiency for dynamic rule sets. While one specific example of this system is described above, other examples which can be employed in embodiments of the invention are disclosed in our above-referenced patent applications, and in the IBM Research Report and GLOBECOM'02 references above. While these systems are preferred, other systems for generating the range IDs could in principle be employed, such as that described in the Gupta reference above. In general, the way in which selected range IDs are combined to produce a search key, and the implementation of the final search, will depend on the particular system used to generate the range IDs. Various systems, including LPM (Longest Matching Prefix) search trees and look-up tables stored in TCAMs, can be employed for the final search as described in the aforementioned references.

Figure 7:
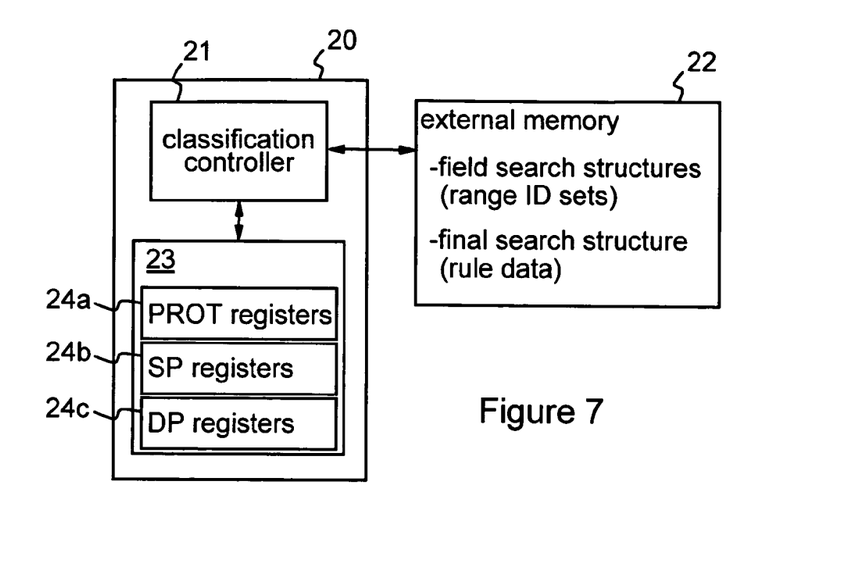
FIG. 7 is a schematic block diagram of apparatus for implementing a multi-field classification process embodying the second aspect of the invention.

FIG. 7 is a schematic block diagram of apparatus for implementing a classification method embodying the second aspect of the invention. This apparatus can be provided in a network device generally as described with reference to FIG. 5. The classification method performed here provides multi-field classification of data packets according to a given set of processing rules, based on the category type system described above with reference to FIGS. 1 to 3. For the purposes of this example, it is assumed that the classification rule set requires evaluation of the same five packet header fields as the embodiment of FIG. 4. In this embodiment, the classification apparatus includes a processor chip 20 implementing classification controller 21 which performs the various steps of the classification process. This process utilizes first and second memories. The first memory is external, off-chip memory 22 in which the field search structures for the five fields to be evaluated are stored, together with the final search structure for the rule set. The second memory is on-chip memory indicated generally at 23, including three sets of registers 24a, 24b and 24c. Registers 24a store a set of frequently-occurring values for the PROT number field in data packets. For each PROT value in registers 24a, an associated indicator in the form of a range ID is stored in on-board memory 23. The association between a frequently-occurring value and its range ID can be provided in any convenient manner, for example by storing the associated range IDs in the same or a related set of registers. In any case, the range ID associated with a given frequently-occurring PROT value is the range ID corresponding to that PROT value from the range ID set of the PROT field search structure in external memory 22. Similarly, registers 24b and 24c store sets of frequently-occurring values for the SP and DP number fields respectively. Again, each value in registers 24b and 24c is associated with a range ID, this being the range ID corresponding to that field value in the appropriate SP or DP field search structure.

Figure 8:
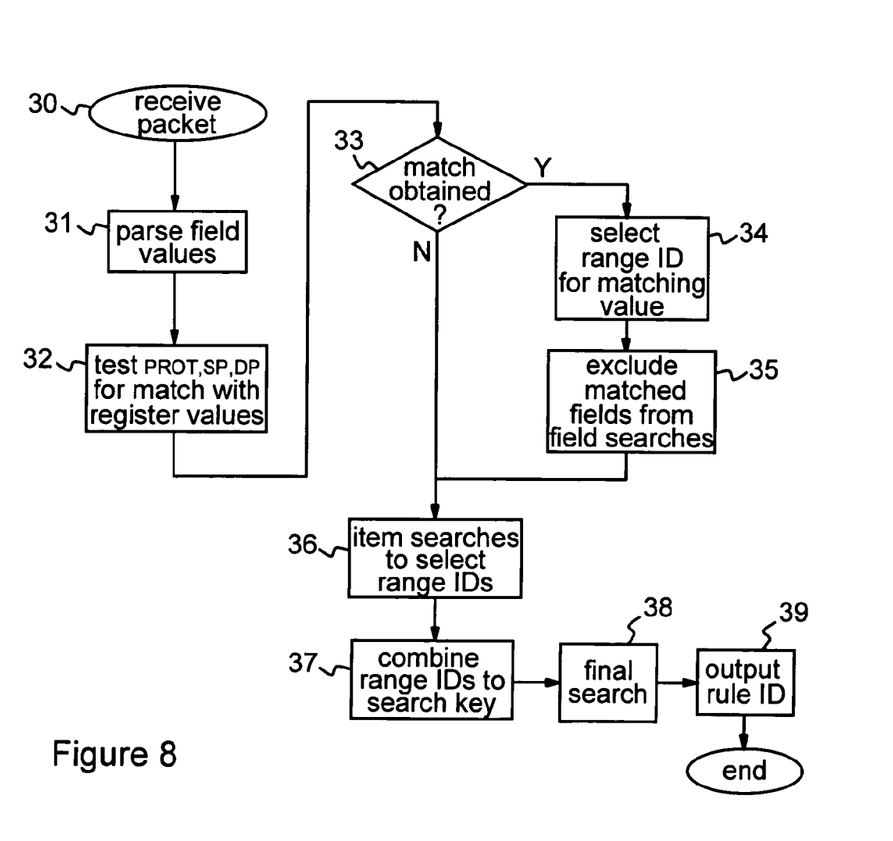
FIG. 8 is a flow chart illustrating operation of the FIG. 7 apparatus.

The flow chart of FIG. 8 illustrates the basic steps in operation of the classification method of this embodiment. On receipt of a packet at step 30, the packet is parsed at step 31 by classification controller 21 to identify the five field values SA, DA, SP, DP and PROT. In step 32 controller 4 then performs a preliminary test for each of the SP, DP and PROT values. Specifically, each field value is tested for a match with any of the frequently-occurring values stored in the appropriate register-set 24a, 24b or 24c for that field. In each case, if a match is obtained at decision block 33, then in step 34 controller 21 selects for that field the range ID stored in on-board memory 23 which is associated with the matching frequently-occurring value. Any field for which a match is obtained with a frequently-occurring value is then excluded in step 35 from the subsequent field searches for the packet. In particular, in step 36, controller 21 proceeds with the field searches for any field not excluded in step 35. Field searches are therefore performed for the SA and DA fields, and any of the SP, DP and PROT fields for which no match has been obtained in the previous preliminary tests. As before, each field search involves accessing the corresponding field search structure in external memory 22 to select the appropriate range ID for the input field value. The resulting five range IDs, comprising those selected in the item searches and any selected via a preliminary test, are then combined in step 37 to produce a search key. In step 38 controller 4 uses the search key to perform the final search for the rule set, accessing the final search structure in memory 22 to obtain the highest-priority rule ID as described above. The rule ID is then output in step 39, whereby the packet can be processed in accordance with the appropriate rule, and the classification process is complete for the data packet.

It will be seen that the above method exploits frequently-occurring values in certain fields to be evaluated for a rule set, enabling field searches to be avoided whenever these values occur in data packets. Thus, the number of external memory accesses, and the performance delays associated with field searching, can be significantly reduced. The particular number and values of frequently-occurring field values can be selected as appropriate for a given system, making maximum use of the available on-board memory and thus minimizing the need for field searches. Particular examples of frequently-occurring values that can be used for the PROT field in the above embodiment are:

1 ICMP (Internet Control Message Protocol) 2 IGMP (Internet Group Management Protocol) 4 IP encapsulation 6 TCP 17 UDP 41 IPv6 (Internet Protocol version 6)

Preliminary tests are also provided for the source and destination port numbers in the above example since a similarly small number of values for these occur frequently in rule sets such as firewall rule sets, e.g. 20, 21 (file transfer protocol), >1023, etc., depending on the specific application. There are, however, various other fields for which preliminary tests might be performed in other embodiments, for example TOS (Type of Service), IP addresses (multi-cast etc.,) as will be apparent to those skilled in the art. In general therefore, preliminary tests may be performed for one or more of the fields to be evaluated, in each case using a set of (one or more) frequently-occurring values, as appropriate for a given system.

Other modifications to the above embodiment can be envisaged. For example, advantages in terms of reduced performance delays associated with field searches are still obtained in embodiments where both the first and second memories 22, 23 above are either external or on-chip memory. Also, in other embodiments frequently-occurring values might be stored as hard-wired values, or in a small cache for example. Moreover, in general any category (3) type system can be employed for the multi-field search process. However, preferred implementations use item searches with range IDs derived from primitive range hierarchies so as to partially encode the rule ranges. This has been discussed above in connection with the embodiment of FIGS. 4 to 6, and corresponding comments apply in the present case.

A classification system embodying a third aspect of the invention will now be described with reference to FIGS. 9 and 10. This method is employed for context-based rule sets. In this scenario, a plurality of different rule sets are provided for different packet contexts i.e. ingress contexts for incoming packets or egress contexts for outgoing packets in a processing device. In a firewall for example, different ingress contexts may correspond to different VPNs in a communications network. The context of a given packet can be defined in various ways, and is indicated by some form of context identifier associated with the packet, for example a VPN identifier, port number etc., specified in the packet itself. A different rule set is defined for each context, and each incoming packet must be classified according to the particular context-specific rule set which corresponds to the context identifier associated with that packet. In practice, as many as hundreds of different contexts may be defined in a given system, but for ease of explanation only three contexts are employed in the simple embodiment to be described. Thus, three context-specific rule sets are defined in the system, each corresponding to one of three context identifiers (referred to here simply as 1, 2 and 3) which may be associated with packets to be classified. In this example, each rule set requires evaluation of the same five packet header fields as the earlier embodiments, namely the SA, DA, SP, DP and PROT fields.

Figure 9:
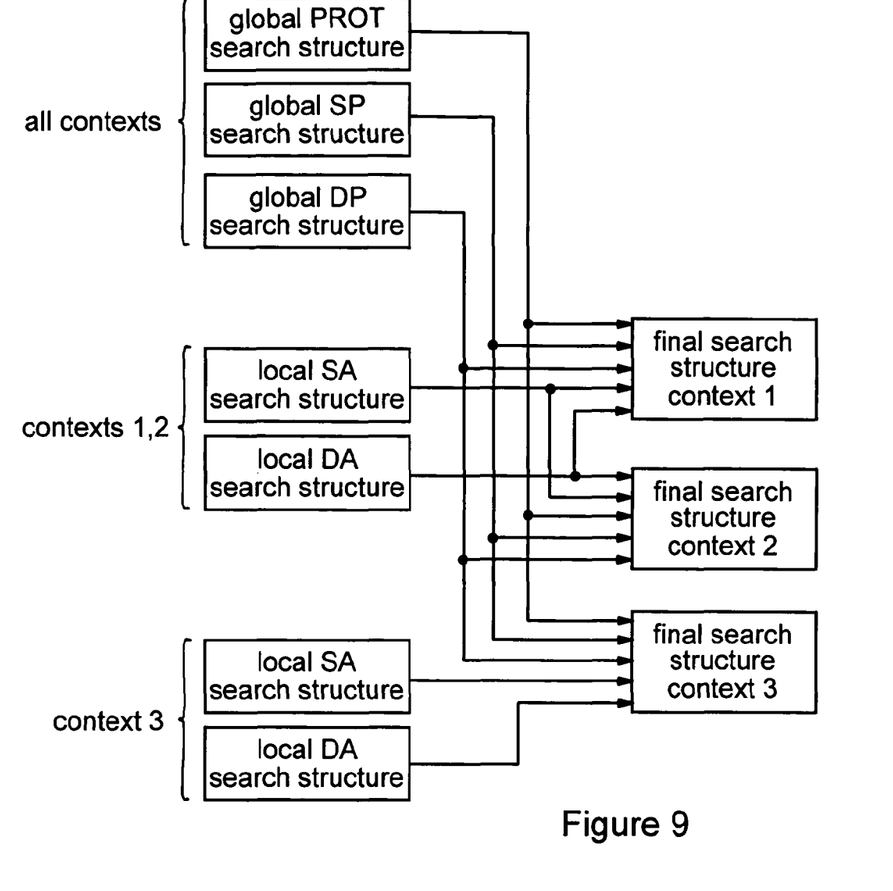
FIG. 9 is a schematic representation of a multi-field classification system embodying the third aspect of the invention.
Figure 10:
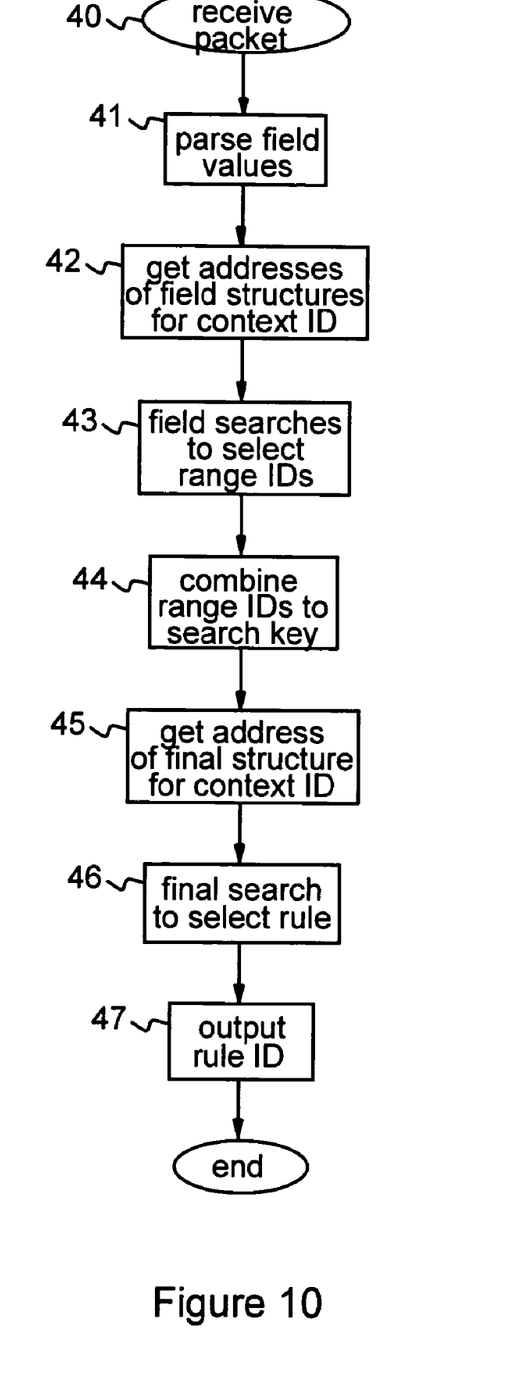
FIG. 10 is a flow chart illustrating operation of the FIG. 9 system.

An overview of the system is illustrated by the schematic of FIG. 9 in terms of the search structures employed in the classification process. These consist of seven field search structures shown on the left-hand side of the figure, and three final search structures on the right-hand side of the figure. For each of the PROT, SP and DP fields a single field search structure is provided. These are "global" search structures which are used for all contexts, and are thus associated with all three context identifiers as explained further below. For the SA field, two field search structures are provided. Each of these is a "local" search structure and is used for a respective set of the contexts. In this example, one local SA search structure is associated with context IDs 1 and 2, and the other local SA search structure is associated with context ID 3. Similarly, two local field search structures are provided for the DA field, one associated with context IDs 1 and 2, and the other associated with context ID 3. Each of the field search structures comprises a set of range IDs as described earlier, but in this case each global search structure accommodates the relevant rule ranges from all context-specific rule sets. That is, for each of the PROT, SP and DP fields, the rule ranges relating to that field in all rule sets are included in the process of generating range IDs for the field as discussed above. In contrast, each local search structure accommodates the relevant rule ranges only from those rule set(s) corresponding to the context ID(s) associated with that search structure. Three final search structures are provided in this example, one for each context and associated with the corresponding context ID as discussed below. Each final search structure comprises rule data encoding the rule ranges for the rules of one of the context-specific rule sets as explained earlier. As indicated schematically in the figure, range IDs selected via a global search structure can be used in searching all final search structures. Range IDs selected via a local search structure can be used in searching the final search structures associated with the same context ID(s) as the local search structure.

The classification process using the search structures of FIG. 9 can be implemented in a network device generally as described with reference to FIG. 5, with the search structures stored in memory of the device and a classification controller performing the various steps of the classification process detailed below. In addition, the association between particular context IDs and particular search structures as discussed above can be provided via look-up tables stored in the device memory. Specifically, for each of the five fields to be evaluated in the classification process, the context IDs can be tabulated against the start address of the associated field search structure in the memory. The start addresses for each of the final search structures can be similarly tabulated for each of the context IDs. The basic steps performed by the classification controller in operation are illustrated in the flow chart of FIG. 10.

On receipt of a packet at step 40, the packet is parsed at step 41 to identify the required five field values. In step 42 the classification controller then accesses the look-up table described above to obtain, for each of the five fields, the start address of the field search structure associated with the context ID for the current packet. In step 43 the controller then performs the field searches, for each field accessing the field search structure at the appropriate start address in the memory so as to select the range ID corresponding to the input field value. The five range IDs are then combined in step 44 to produce a search key. Next, in step 45 the controller accesses the lookup table to retrieve the start address for the final search structure associated with the packet context ID. In step 46 the controller 4 then performs the final search using the search key generated in step 44 and the appropriate final search structure for the packet context. The result of the final search is the rule ID for the highest priority rule in the appropriate rule set for the packet context. The rule ID is then output in step 47, whereby the packet can be processed according to the applicable rule, and the classification process is complete for the current packet.

It will be seen that the above method provides for classification of data packets according to a plurality of context-specific rule sets, but that the search structures for the field searches are combined to provide a highly efficient overall data structure. For the PROT, SP and DP fields, different rule sets typically contain many rule ranges in common. For these fields therefore, a global field search structure is provided in which the rule ranges for the different contexts are encoded in a uniform way. For the SA and DA fields, different groups of one or more context-specific rule sets typically contain rule ranges which are unique to that group. Hence separate local field search structures are provided for each group. In this way, the overall data structure can be optimized for the multiple rule sets, and storage efficiency significantly improved, without a significant increase in search key lengths, thus rendering fast and efficient final searches possible. Overall therefore, a highly efficient classification system is provided for multiple contexts.

Again, many modifications can be made to the simple embodiment described above. Firstly, many more contexts will generally be involved in the system in practice, and rule sets may require evaluation of a variety of different fields in data packets. While all rule sets require evaluation of all fields in the above example, in other embodiments some rule sets may require field values not required by others. Also, global search structures may in general be provided for one or more of the common group of fields, with local search structures provided for the remaining fields. Further, while separate final search structures are provided for each context above, in other embodiments combined final search structures could be provided for groups of contexts, or even one final search structure for all contexts. Moreover, in general any category type system can be employed for the underlying multi-field search process, though preferred implementations are as discussed above in connection with the earlier embodiments, and corresponding comments apply.

Figure 11:
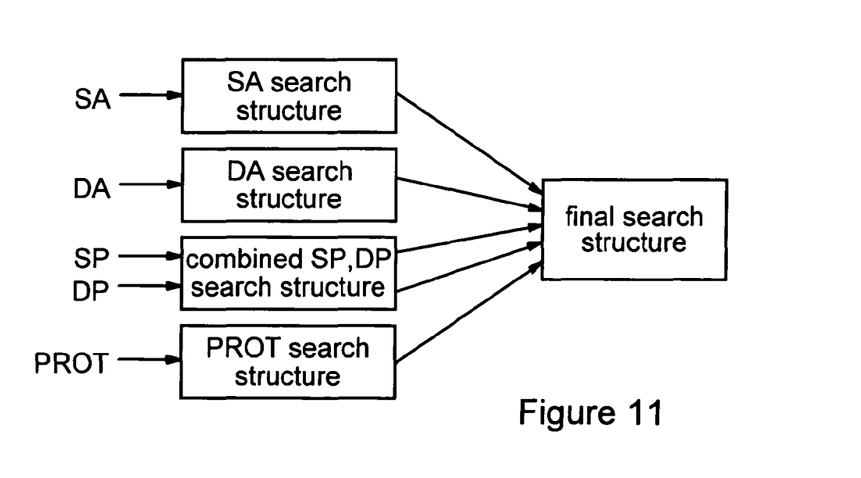
FIG. 11 is a schematic representation of a multi-field classification system embodying the fourth aspect of the invention.

An example of a classification method embodying the fourth aspect of the invention is illustrated in FIG. 11. Again, this figure gives a schematic overview of the system in terms of the search structures used in the classification process. In this example, classification is performed according to a single rule set which requires evaluation of the same five fields as the earlier embodiments. Here, four field search structures are provided, each comprising a set of range IDs as described above. Separate search structures are provided for the SA, DA and PROT fields, so in each case the range IDs are derived in the usual way using the rule ranges corresponding to the respective field. However, for the SP and DP fields, a combined field search structure is provided, this search structure accommodating the rule ranges corresponding to both fields. That is, both SP and DP rule ranges are included in the process of generating the range IDs for this search structure, both sets of rule ranges being treated as a single dimension in the example of this process described earlier.

The classification process using the search structures of FIG. 11 can again be implemented in a network device generally as described with reference to FIG. 5, with the search structures stored in memory of the device and a classification controller performing the various steps of the classification process. The operation is generally as for the basic classification method of FIG. 1, with the controller accessing the appropriate field search structures in memory to perform the field searches for the five field values. Here, however, the combined search structure will be used for both of the SP and DP field searches. Separate logical searches are still performed, but using the same, combined search structure in each case. The five range IDs resulting from the field searches are then combined as before to produce the search key for the final search which provides the applicable rule ID.

Storage efficiency is improved in the above example by providing a combined field search structure for the SP and DP fields due to the similarity in the rule ranges for these fields in typical rule sets. The combined search structure thus encodes the rule ranges for both fields in a uniform way, reducing overall storage requirements. Combined search structures may of course be provided for other fields, such as the SA and DA fields for example, as appropriate for a given system. In general, one or more combined search structures may be provided for respective pluralities of the fields to be evaluated, with individual field search structures provided for any remaining fields. In addition, while in general any category type system can be employed for the underlying multi-field search process, preferred implementations are as discussed above in connection with the earlier embodiments, and corresponding comments apply.

It will be appreciated that a given packet classification system may embody more than one of the various aspects of the invention exemplified above so as to optimize overall efficiency. For example, where the methods described in connection with a single rule set are incorporated in a multiple rule set classification process, the advantages of these techniques are magnified accordingly. Various other changes and modifications can of course be made to the embodiments detailed above without departing from the scope of the invention.

We claim:

1. An apparatus for classifying a data packet according to a plurality of differing sets of processing rules, the apparatus comprising:
    an interface for receiving the data packet;
    a classification controller for parsing the data packet to identify a plurality of data items required for classifying said data packet;
    memory for storing a set of range identifiers for each data item in the data packet corresponding to a rule range defined in the rule sets, the set of range identifiers for said data item indicating, for all possible values of the data item, which of the rule ranges corresponding to that data item in the rule sets a value intersects; and for further storing, for each rule set, rule data encoding the rule ranges for rules in that set, wherein each processing rule of each set defines a plurality of rule ranges each indicating a range of possible values of a corresponding data item in the packet for which that rule applies, and rule ranges defined in different rule sets correspond to a common set of data items; and a controller for performing a preliminary test of at least one of the data items to determine whether any of said data item's values match known frequently-occurring values for that data item;

if a match is obtained, selecting for the data item a rule range identifier associated with the matching frequently-occurring value;

for those data items for which no match is obtained, performing item searches for respective data items in the parsed data packet corresponding to rule ranges defined in the plurality of differing sets of processing rules, wherein performing the item search for said data item comprises:

selecting a rule range identifier corresponding to the identified data item value from a predetermined set of rule range identifiers for that data item, said set of rule range identifiers indicating, for all possible values of the data item, which of the rule ranges corresponding to the data item in the rule sets a value intersects; and wherein independent item searches are performed only once for all rule sets; combining the rule range identifiers to produce a search key; and performing respective final searches for the rule sets based on the range identifiers selected by the item searches, the final search for each rule set using the search key and predetermined rule data encoding the rule ranges for rules in that set, to identify a highest priority rule of any rules in the set which are applicable to the data packet.

2. The apparatus of claim 1, wherein the independent item searches are conducted such that a result of one item search is not dependent on a result of a subsequent item search.

3. The apparatus of claim 1, wherein the rule ranges defined in different rule sets correspond to a common set of data items.

4. The apparatus of claim 3 wherein the common set of data items comprises all data items have a corresponding rule range in the rule sets.

5. The apparatus of claim 1, wherein the controller further defines a priority order for the rules in each rule set.

6. The apparatus of claim 1, wherein the rule sets correspond to respective processing applications of the processing device.

7. The apparatus of claim 1, wherein the controller performs final searches using a separate search structure for each rule set, each search structure comprising the rule data for a respective rule set.

8. The apparatus of claim 7, wherein the search structure for a rule set relates possible combinations of range identifiers for data items corresponding to rule ranges defined in that rule set to applicable rules in that rule set.

9. The apparatus of claim 7, wherein for each rule set, the controller adds a rule set identifier to the search key to generate a final search key for that rule set; and performs the final search for each rule set using the final search key for that rule set, wherein the final searches are performed using a combined search structure comprising the rule data for all rule sets, the rule data for each rule set being associated in the search structure with the rule set identifier for that rule set.

10. The apparatus of claim 9, wherein for each rule set identifier, the search structure relates possible combinations of range identifiers for data items corresponding to rule ranges defined in the rule set associated with that rule set identifier to applicable rules in that rule set.

11. The apparatus of claim 1, wherein the set of range identifiers for a data item is derived from a primitive range hierarchy so as to partially encode the rule ranges corresponding to that data item.

12. A program storage device readable by a digital processing apparatus and having a program of instructions which are tangibly embodied on the storage device and which are executable by the processing apparatus to perform a method for classifying a data packet according to a plurality of sets of processing rules, said method comprising steps of:

receiving the data packet;

parsing the data packet to identify a plurality of data items required for classifying said data packet;

storing a set of range identifiers for each data item in the data packet corresponding to a rule range defined in the rule sets, the set of range identifiers for said data item indicating, for all possible values of the data item, which of the rule ranges corresponding to that data item in the rule sets a value intersects;

storing, for each rule set, rule data encoding the rule ranges for rules in that set, wherein each processing rule of each set defines a plurality of rule ranges each indicating a range of possible values of a corresponding data item in the packet for which that rule applies, and rule ranges defined in different rule sets correspond to a common set of data items;

performing a preliminary test of at least one of the data items to determine whether any of said data item's values match known frequently-occurring values for that data item;

if a match is obtained, selecting for the data item a rule range identifier associated with the matching frequently-occurring value;

for those data items for which no match is obtained, performing item searches for respective data items in the parsed data packet corresponding to rule ranges defined in the plurality of differing sets of processing rules, wherein performing the item search for said data item comprises:

selecting a rule range identifier corresponding to the identified data item value from a predetermined set of rule range identifiers for that data item, said set of rule range identifiers indicating, for all possible values of the data item, which of the rule ranges corresponding to the data item in the rule sets a value intersects; and performing independent item searches only once for all rule sets;

combining the rule range identifiers to produce a search key; and performing respective final searches for the rule sets based on the range identifiers selected by the item searches, the final search for each rule set using the search key and predetermined rule data encoding the rule ranges for rules in that set, to identify a highest priority rule of any rules in the set which are applicable to the data packet.

* * * * *